UNITED STATES PATENT OFFICE.

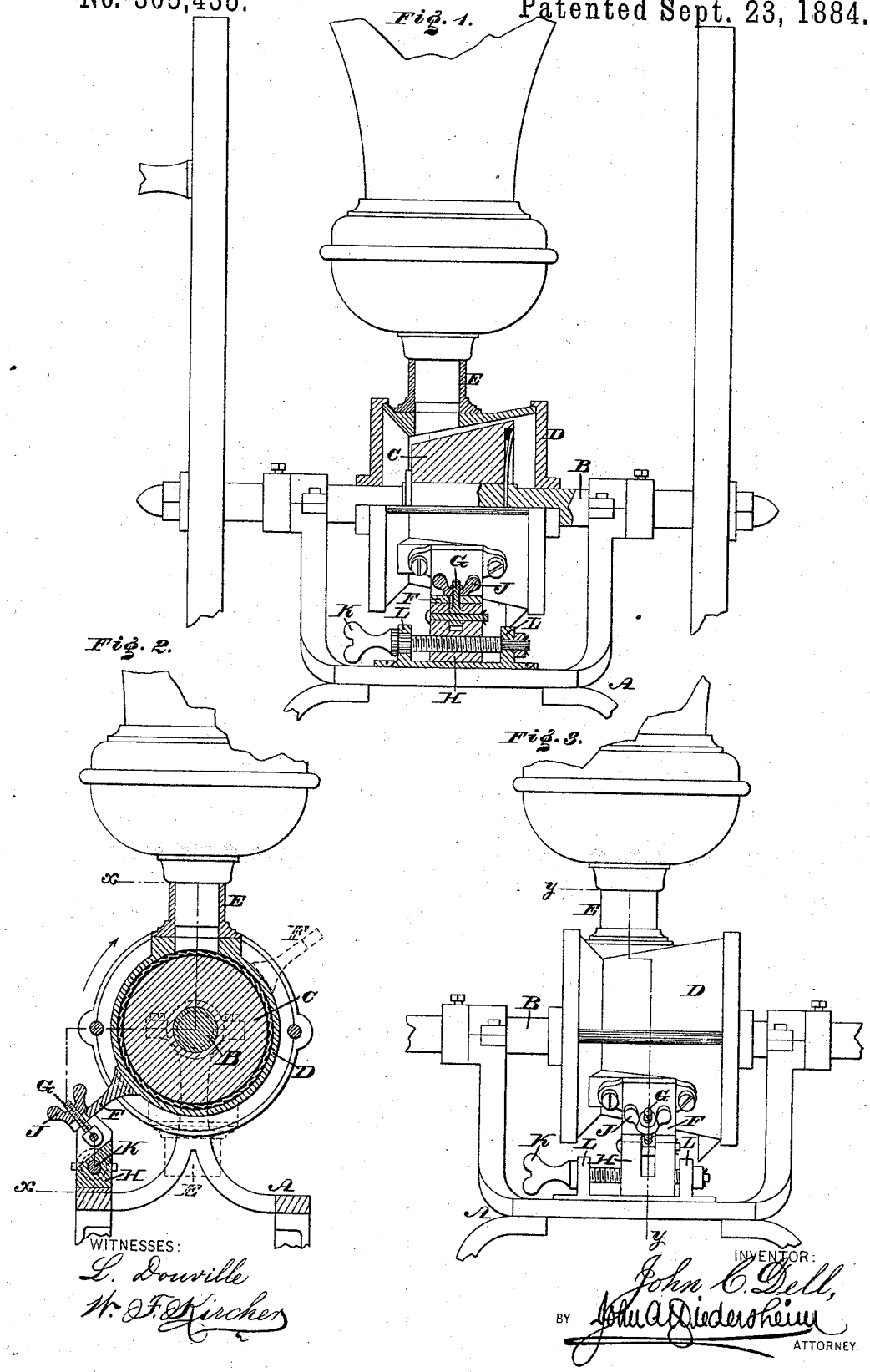

JOHN C. DELL, OF PHILADELPHIA, PENNSYLVANIA.

GRINDING-MILL.

SPECIFICATION forming part of Letters Patent No. 305,435, dated September 23, 1884.

Application filed March 29, 1884. (No model.)

*To all whom it may concern:*

Be it known that I, JOHN C. DELL, a citizen of the United States, residing in the city and county of Philadelphia, State of Pennsylvania, have invented a new and useful Improvement in Grinding-Mills, which improvement is fully set forth in the following specification and accompanying drawings, in which—

Figure 1 is a partial side elevation and partial vertical section in line *x x*, Fig. 2, of a portion of a grinding-mill embodying my invention. Fig. 2 is a vertical section in line *y y*, Fig. 3. Fig. 3 is a side elevation of the main portions, corresponding to Fig. 1.

Similar letters of reference indicate corresponding parts in the several figures.

This invention relates to grinding-mills which employ a grinding-cone and a shell adjustable with respect thereto; and said invention consists in certain devices for effecting such adjustment and allowing said shell to be rotated to free the feed-spout from foreign matter, as hereinafter described, and pointed out in the claims.

Referring to the drawings, A represents part of the stand or frame of the mill, and B the driving-shaft, C the cone, D the shell, and E the inlet-spout thereof, the cone being fixed to the shaft B so as to rotate therewith, and the shell loosely mounted on said shaft, so as to be capable of being rotated, and thus overturn the spout, as shown by dotted lines, Fig. 2, whereby, should nails, stones, &c., have entered the shell with the coffee, spice, &c., to be ground, such injurious obstacles may be readily removed or will fall out, or the shell and cone clear themselves thereof, as set forth in the Letters Patent No. 210,676, granted to me on the 10th day of December, 1878.

In order to hold the shell in operative position during the grinding operation—that is, with the spout E upright and sustaining the hopper or urn—there is connected with the side of the shell a forked or slotted lug, F, with which engages a bolt, G, whose lower end is mounted on a block, H, supported on the frame A. The upper end of the bolt G is screw-threaded for the engagement of a nut, J, it being seen that the lug F rests on the block H, the bolt enters the slot or fork of the lug, and the nut tightens against the walls of the lug, whereby the bed is securely retained during the operation of the mill. When it is desired to overturn the spout, the hopper or urn is removed, the nut J loosened, and the bolt G thrown out from the lug F, whereby the latter is released and the shell may be rotated and the spout moved around therewith.

In order to adjust the shell relatively to the cone, whereby the mill may grind fine or coarse, and provision be made for the wear of the shell and cone, I employ a screw, K, which is journaled in ears L, which are supported on the frame A, the screw engaging with the block H, to which the shell is secured. It will be seen that by rotating the screw the block will be moved laterally relatively to the direction of rotation of said screw, and thus the shell follows the motions of the block, and is accordingly set nearer to or farther from the cone, for the purposes hereinbefore stated.

In the Letters Patent heretofore granted to me the heads of the shell are fixed to the frame, and the body of the bed is rotatable on said heads. In the present case the body and heads are bolted together and rotatable as one on the shaft, thus simplifying the construction and permitting lateral motions or adjustment of the shell.

Having thus described my invention, what I claim as new, and desire to secure by Letters Patent, is—

1. In a grinding-mill, a shell, in combination with a shaft on which it is mounted, a feed-spout attached to said shell, a grinding-cone carried by said shaft within said shell, and clamping devices which hold said shell stationary, the release of said shell therefrom allowing it to be turned for the purpose of inverting and clearing said spout, substantially as set forth.

2. In a grinding-mill, a shell rotatably mounted on the driving-shaft and provided with a slotted lug on its side, a pivoted bolt connected with the frame, and a nut, said bolt entering the slot of the lug, and said nut tightening the lug in position, the parts being combined and operating substantially as and for the purpose set forth.

3. In a grinding-mill, the combination of a relatively-stationary cone and a driving-shaft carrying the same, with a shell movable longitudinally over said shaft and cone, the forked lug F on said shell, the swinging bolt G, the block H, which is laterally movable in the frame, the ears L, and screw K, said screw being journaled in the ears and engaging with the laterally-movable block, substantially as set forth.

4. In a grinding-mill, the combination of the cone, the shaft, the shell mounted on the shaft and provided with a feed-spout, the block, adjusting-screw K, the slotted lug F, screw G, projecting from said block through the slot in said lug, and the nut J, which engages with said screw and clamps said lug to said block, these latter devices thus serving both as connections which allow the adjustment of the shell with respect to the cone and as means for allowing the rotation of the shell to free the feed-spout from foreign matter, substantially as set forth.

JOHN C. DELL.

Witnesses:
JOHN A. WIEDERSHEIM,
A. P. GRANT.